United States Patent
Caullet et al.

(10) Patent No.: US 7,622,099 B2
(45) Date of Patent: Nov. 24, 2009

(54) PROCESS FOR PREPARATION OF ZBM-30-TYPE ZEOLITES USING A DIAMMONIUM ETHER-TYPE COMPOUND AS AN ORGANIC STRUCTURING AGENT

(75) Inventors: Philippe Caullet, Illzach (FR); Sylvie Lacombe, Saint Genis Laval (FR); Jean-Louis Paillaud, Mulhouse (FR); Nicolas Bats, Feyzin (FR); Loic Rouleau, Charly (FR)

(73) Assignee: Institut Francais du Petrole, Rueil Malmaison (FR)

( * ) Notice: Subject to any disclaimer, the term of this patent is extended or adjusted under 35 U.S.C. 154(b) by 559 days.

(21) Appl. No.: 11/592,326

(22) Filed: Nov. 3, 2006

(65) Prior Publication Data

US 2007/0134152 A1    Jun. 14, 2007

(30) Foreign Application Priority Data

Nov. 4, 2005   (FR) ................................ 05 11278

(51) Int. Cl.
 C01B 39/00    (2006.01)
 C01B 33/00    (2006.01)
 C01B 21/00    (2006.01)
 C01B 21/06    (2006.01)
 C01B 21/064   (2006.01)
 C01B 21/072   (2006.01)
 C01B 21/076   (2006.01)

(52) U.S. Cl. ...................... 423/708; 423/700; 423/701; 423/704; 423/705

(58) Field of Classification Search .................. 423/708
See application file for complete search history.

(56) References Cited

U.S. PATENT DOCUMENTS

| 448,675 | A | * | 3/1891 | Chu ........................... 422/208 |
| 4,525,546 | A | | 6/1985 | Fukawa et al. |
| 5,098,685 | A | | 3/1992 | Casci et al. |

FOREIGN PATENT DOCUMENTS

| EP | 0 046 504 A | 3/1982 |
| EP | 0 142 317 A | 5/1985 |
| GB | 2 077 709 A | 12/1981 |

OTHER PUBLICATIONS

Fakstorp, Jorgen; Christiansen, Jytte, "Bisfunctional Amines and Ammonium Compounds. VI. Further Homologs and Analogs of bis-Chlorine Ether Salts," 1957, Acta Chemica Scandinavica, 11, pp. 1698-1705.*

Araya A et al. Zeolite Synthesis in the NH2 (CH2) 6NH2-AL203-SI02-H20 System At 180 DEG C, Journal Catalysis, vol. 85, 1985, pp. 135-142, New York, New York.

* cited by examiner

Primary Examiner—Melvin C Mayes
Assistant Examiner—Colin W Slifka
(74) Attorney, Agent, or Firm—Millen, White, Zelano & Branigan, P.C.

(57) ABSTRACT

The invention relates to a process for preparation of a zeolite that is selected from among the ZBM-30, ZSM-48, EU-2 and EU-11 zeolites, comprising the mixing in an aqueous medium of at least one source of at least one element X (Si and/or Ge) and at least one nitrogen-containing organic compound Q. Said nitrogen-containing organic compound Q is selected from among the compounds comprising at least one ether group and two terminal ammonium groups and their precursors.

18 Claims, No Drawings

PROCESS FOR PREPARATION OF ZBM-30-TYPE ZEOLITES USING A DIAMMONIUM ETHER-TYPE COMPOUND AS AN ORGANIC STRUCTURING AGENT

TECHNICAL FIELD

This invention relates to the field of the preparation of zeolites. It relates more specifically to a new process for preparation of ZBM-30-type zeolites, i.e., zeolites selected from among the ZBM-30, ZSM-48, EU-2 and EU-11 zeolites. These zeolites have the following chemical composition, expressed in the number of moles of anhydrous oxide per 100 moles of $XO_2$:

$$(100)XO_2:(0-0.5)T_2O_3:(0-3)Q:(0-4)M_2O$$

where X is silicon and/or germanium; T is at least one element that is selected from among aluminum, iron, gallium, boron, titanium, vanadium, zirconium, molybdenum, arsenic, antimony, chromium and manganese; Q represents the organic material that is occluded in the pores of the zeolite, expressed in moles of nitrogen-containing organic cations, and M is an alkaline-metal cation.

The ZBM-30 or ZSM-48 zeolites are generally synthesized by mixing in an aqueous medium at least one element X that is selected from among silicon and germanium and optionally at least one element T that is selected from among aluminum, iron, gallium, boron, titanium, vanadium, zirconium, molybdenum, arsenic, antimony, chromium and manganese. The reaction mixture comprises at least one nitrogen-containing organic structuring agent.

PRIOR ART

More than one framework topology can be attributed to the ZBM-30 zeolite due to the existence of very weak and wide lines on the X-ray diffractogram. Due to the uncertainty on the exact structure of the ZBM-30, no structural type is attributed to it for the moment.

The three zeolites that to date have a structure corresponding to that of ZBM-30 are the ZSM-48, EU-2 and EU-11 zeolites (P. Jacobs and J. Martens, *Stud. Surf. Sci. Catal.*, 33, 275 (1987)).

Schlenker et al. taught that the structure of the ZSM-48 zeolite is characterized by linear channels that are delimited by ring openings with 10 tetrahedrons whose dimensions are 5.3 by 5.6 Å (J. L. Schlenker, W. J. Rohrbaugh, P. Chu, E. W. Valyocsik, G. T. Kokotailo, *Zeolites*, 5, 355-358 (1985)).

In the prior art, a certain number of processes for the preparation of ZBM-30, ZSM-48, EU-2 and EU-11 zeolites, having been the object of publications and patent applications, are already known.

The ZSM-48 zeolite was synthesized with multiple nitrogen-containing organic agents, alone or in a mixture, such as the R. Szostak summary in "Handbook of Molecular Sieves, Van Nostrand Reinhold, New York (1992)." P. Chu et al. (U.S. Pat. No. 4,397,827 and U.S. Pat. No. 4,448,675) use a combination of alkylamine (in particular n-octylamine) and an ammonium compound (in particular tetramethyl ammonium). Xu Wenyang et al. (*Zeolites* 10, 753 (1990)) used a combination of hexanediamine and triethylamine. L. D. Rollman et al. (U.S. Pat. No. 4,423,021) describe the use of $C_4$ to $C_{20}$ alkyldiamine. Kennedy et al. (WO 99/35087) describe a process for synthesis of the ZSM-48 zeolite using ethylenediamine as an organic structuring agent. Suzuki et al. (*Zeolites* 6, 290 (1986)) teach the use of pyrrolidine as an organic structuring agent for the synthesis of ZSM-48. Di Renzo et al. (FR-A-2 698 863) describe a process for synthesis of ZSM-48-type zeolites in the absence of nitrogen-containing organic agent, by hydrothermal reaction of a mixture containing a tetravalent silicon source, hydroxide ions, water and a glycol as well as optionally a trivalent aluminum source.

The EU-2 and EU-11 zeolites were synthesized by using hexamethonium as an organic structuring agent, i.e., a compound that contains two quaternary ammonium groups that are separated by a hexyl chain (J. L. Casci et al., GB 2,077, 709; A. Araya et al., *J. Catal.* 85, 135 (1985)).

L. Marosi et al. (EP-A-046 504) disclose the preparation of the ZBM-30 zeolite by using alkyldiamines (in particular hexamethylenediamine and triethylenediamine).

This invention proposes providing a new method for preparation of a zeolite that is selected from among the ZBM-30, ZSM-48, EU-2 and EU-11 zeolites, whereby said method represents an alternative to the methods for preparation that are known from the prior art.

DESCRIPTION OF THE INVENTION

This invention relates to a process for preparation of a zeolite that is selected from among the ZBM-30, ZSM-48, EU-2 and EU-11 zeolites comprising at least one element X that is selected from among silicon, germanium, and the mixture of these two elements, comprising the mixing in an aqueous medium of at least one source of at least one element X and at least one nitrogen-containing organic compound Q, whereby said process is characterized in that said nitrogen-containing organic compound Q is selected from among the compounds that comprise at least one ether group and two terminal ammonium groups and their precursors.

The zeolite that is obtained by the process of the invention is a ZBM-30-type zeolite that is selected from among the ZBM-30, ZSM-48, EU-2 and EU-11 zeolites.

The element X is preferably silicon.

In accordance with the process according to the invention, the nitrogen-containing organic compound Q, which acts as a structuring agent, comprises at least one ether group and two terminal ammonium groups. In the rest of the disclosure of the invention, the nitrogen-containing organic structuring agent Q that is used in the process according to the invention is referred to as diammonium ether type: it has the general formula $[R_1R_2R_3N-[(CH_2)_x-O-(CH_2)_y]_z-NR_1R_2R_3]^{2+}$, in which z is a whole number between 1 and 10, x is a whole number between 1 and 6, and y is a whole number between 1 and 6. Preferably, z is included between 1 and 5, and very preferably z=1.

When z=1, the nitrogen-containing organic compound Q comprises a single ether group. Preferably, x is between 1 and 3, and very preferably, x=2. Preferably, y is between 1 and 3, and very preferably, y=2. The values of x and y can be identical or different: the alkyl chains of each side of the ether group(s) can be similar or different. According to the process of the invention, it is advantageous to use a nitrogen-containing organic structuring agent Q that has identical alkyl chains on each side of the ether group(s). Very preferably, when the nitrogen-containing organic compound Q comprises a single ether group (z=1), the alkyl chain is advantageously the same on each side of the ether group, and this alkyl chain is preferably an ethyl chain (x=y=2). In the general formula of the nitrogen-containing organic structuring agent Q, $R_1$, $R_2$ and $R_3$ can be identical or different. It can be hydrogen atoms or $C_1$-$C_4$ alkyl radicals, preferably methyl or ethyl radicals.

The nitrogen-containing organic compound Q is, for example, a bis-(ω-trimethylammonium alkyl)ether salt and/ or a bis-(ω-triethylammonium alkyl)ether salt. This can be, for example, a halide, a hydroxide, a sulfate, a nitrate, an acetate, a silicate or an aluminate. Preferably, the bis-(ω-trimethylammonium alkyl)ether salt and/or the bis-(O)-triethylammonium alkyl)ether salt is a halide, and more preferably a bromide.

The organic synthesis of the nitrogen-containing organic compound Q, such as diammonium ether, is carried out by heating an ethanolic mixture of bis-(ω-haloalkyl)ether and trialkylamine under reflux for at least two hours. Four equivalents of trialkylamine are used per one equivalent of bis-(ω-haloalkyl)ether. The solid, formed during the synthesis, is recovered by filtration, washed by anhydrous ether, and then purified by recrystallization. The synthesis of the bis-(2-trimethylammonium ethyl)ether compound is described more specifically in the publication *J. Pharm. Belg.* 7, 295 (1952) of Morren et al. (see also Example 1 of this application). The synthesis process then consists in reacting the precursor compound, such as bis-(ω-bromoalkyl)ether, in particular the bis-(2-bromoethyl)ether under reflux in ethanol with excess trialkylamine.

Preferably, according to the process of the invention, the mixing in an aqueous medium of at least one source of at least one element X and at least one nitrogen-containing organic compound Q also comprises the introduction of at least one element T that is selected from among aluminum, iron, gallium, boron, titanium, vanadium, zirconium, molybdenum, arsenic, antimony, chromium and manganese. More preferably, the element T is aluminum.

The mixing according to the process of the invention is carried out in the presence of sodium hydroxide or potassium hydroxide.

According to a preferred embodiment, the process according to the invention is carried out in the presence of nuclei S of at least one zeolitic material comprising a zeolite that is selected from among the ZBM-30, ZSM-48, EU-2 and EU-11 zeolites. The zeolite to be prepared and the zeolitic nuclei that are used during the preparation process preferably comprise the same elements X and T. When the element T is absent from the chemical composition of the zeolite to be synthesized, the chemical composition of the zeolitic nuclei is itself also lacking in said element T. Very preferably, the nuclei have the same crystalline nature and the same chemical composition as that of the zeolite to be prepared, i.e., they have the same X/T ratio as that of the zeolite that is prepared.

The zeolitic materials that act as nuclei can be introduced during the process of the invention in several forms. Thus, the nuclei can be introduced after having undergone at least one of the stages selected from among the following stages: washing, drying, calcination and ion exchange. The nuclei can also be introduced in the crude synthesis form.

The zeolitic materials that act as nuclei can be introduced at any moment of the process for preparation of the zeolite to be synthesized. The nuclei can be introduced at the same time as the sources of elements X and T, as the nitrogen-containing organic structuring agent Q or its precursors, or the nuclei can first be introduced into the aqueous mixture or else the nuclei can be introduced after the introduction of the sources of elements X and T and the structuring agent. Preferably, the nuclei are introduced after homogenization, at least in part, of the aqueous mixture that contains the sources of elements X and T, and said nitrogen-containing organic compound or its precursors.

In the process for preparation according to the invention, the reaction mixture has the following composition, expressed in oxide form:

| | |
|---|---|
| $XO_2/T_2O_3$ (mol/mol) | 50-∞ |
| $OH^-/XO_2$ (mol/mol) | 0.002 to 2.0 |
| $Q/XO_2$ (mol/mol) | 0.002 to 5.0 |
| $H_2O/XO_2$ (mol/mol) | 1 to 500 |
| $S/XO_2$ (g/g) | 0.0 to 0.1 | where
X is silicon and/or germanium,
T is at least one element that is selected from among aluminum, iron, gallium, boron, titanium, vanadium, zirconium, molybdenum, arsenic, antimony, chromium and manganese,
Q represents the nitrogen-containing organic compound, also called an organic structuring agent, such as diammonium ether, i.e., comprising at least one ether group and two terminal ammonium groups,
S represents the nuclei of the zeolitic material comprising at least one zeolite in crude, dried, calcined or exchanged form.

Preferably, the reaction mixture has the following composition, expressed in the form of oxides:

| | |
|---|---|
| $XO_2/T_2O_3$ (mol/mol) | 80-∞ |
| $OH^-/XO_2$ (mol/mol) | 0.005 to 1 |
| $Q/XO_2$ (mol/mol) | 0.05 to 2.0 |
| $H_2O/XO_2$ (mol/mol) | 3 to 250 |
| $S/XO_2$ (g/g) | 0.001 to 0.1 |

Even more preferably, the reaction mixture has the following composition, expressed in oxide form:

| | |
|---|---|
| $XO_2/T_2O_3$ (mol/mol) | 100-∞ |
| $OH^-/XO_2$ (mol/mol) | 0.05 to 0.5 |
| $Q/XO_2$ (mol/mol) | 0.05 to 2.0 |
| $H_2O/XO_2$ (mol/mol) | 10 to 100 |
| $S/XO_2$ (g/g) | 0.003 to 0.1 |

The zeolite that is obtained by the process according to the invention advantageously has an X/T ratio that is greater than or equal to 25, where X is selected from among silicon, germanium and the mixture of these two elements, and T is selected from among aluminum, iron, gallium, boron, titanium, vanadium, zirconium, molybdenum, arsenic, antimony, chromium, and manganese.

The source of the element X can be any compound that comprises the element X and can release this element in aqueous solution or in an organic solvent in reactive form. X is preferably silicon. The silicon source can be any of those whose use is usually considered for the synthesis of zeolites, for example the solid silica in powder form, silicic acid, colloidal silica or silica in solution. Among the powder silicas that can be used, it is suitable to cite precipitated silicas, especially those obtained by precipitation from a solution of an alkaline-metal silicate, such as the "Zeosil" or the "Tixosil" produced by Rhodia, the pyrogenated silicas such as the "Aerosil" produced by Degussa, and the "Cabosil" produced by cabot and the silica gels. Colloidal silicas of various grain sizes can be used, such as those sold under the filed trademarks "LUDOX" of Dupont and "SYTON" of Monsanto. The dissolved silicas that can be used are in particular soluble glasses or commercialized silicates that contain: 0.5 to 6.0 and especially 2.0 to 4.0 mol of $SiO_2$ per mol of alkaline metal oxide and the silicates that are obtained by dissolution of silica in an alkaline metal hydroxide, a quaternary ammonium hydroxide or a mixture of the latter.

The source of the element T can be any compound that comprises the element X and can release this element into aqueous solution or into an organic solvent in reactive form. T is preferably aluminum. The aluminum source is most advantageously aluminum hydroxide or sodium aluminate, but can also be aluminum, an aluminum salt, for example chloride, fluoride, nitrate, sulfate, acetate, an aluminum alcoholate or the alumina itself, which is preferably found in a hydrated or hydratable form such as colloidal alumina, pseudoboehmite, gamma-alumina or trihydrates.

It is possible to use mixtures of the sources cited above. Combined sources of silicon and aluminum can also be used, such as amorphous silica-aluminas or certain clays.

The mixture of the elements and compounds constituting the reaction mixture can be carried out in any order.

Preferably, a solution (1) that contains the organic structuring agent or its precursors, sodium or potassium hydroxide, optionally a source of element T, preferably an aluminum source, and water is prepared first, and it is mixed for a variable duration, preferably between 30 minutes and one hour, and preferably at ambient temperature. The source of element X, preferably the silicon source, is then added to the solution (1), and it is mixed for a variable duration, preferably between 30 minutes and one hour, and preferably at ambient temperature, which constitutes the mixture (2). Finally, optionally nuclei are added to the mixture (2), and then it is mixed for a variable duration, preferably between 30 minutes and one hour, and preferably at ambient temperature.

The reaction mixture is usually reacted under autogenous pressure, optionally with input of a gas, for example nitrogen, at a temperature of between 85 and 250° C., preferably between 120 and 220° C., even more preferably between 120 and 180° C., until crystals of the zeolite are formed, which can last from 1 minute to several months according to the composition of the reagents, the method of heating and mixing, the working temperature and the stirring. The stirring is optional, but preferable, since it shortens the duration of the reaction.

At the end of the reaction, the solid phase is collected in a filter and washed. In this stage, the zeolite that is selected from among the ZBM-30, ZSM-48, EU-2 and EU-11 zeolites and obtained according to the process of the invention is called raw straight from synthesis and contains in its intracrystalline pores at least one diammonium ether-type cation, i.e., at least one cation that comprises at least one ether group and two terminal ammonium groups.

The crude synthesis zeolite obtained by the process of the invention can undergo subsequent treatments such as drying, calcination and/or ion exchange. These operations are carried out by any method that is known to one skilled in the art. For example, so as to obtain the hydrogen form of the zeolite that is obtained by the process according to the invention, it is possible to carry out an ion exchange with an acid, in particular a strong mineral acid such as hydrochloric acid, sulfuric acid or nitric acid, or with a compound such as chloride, sulfate or nitrate of ammonium. The ion exchange can be carried out by suspension in one or more steps with the ion exchange solution. The zeolite can be calcined before or after the ion exchange, or between two ion exchange stages. The zeolite is preferably calcined before the ion exchange so as to eliminate any organic substance included in the pores of the zeolite to the extent that the ion exchange is facilitated.

Generally, the cation or cations of the zeolite obtained by the process of the invention can be replaced by one or more metal cations of any type and in particular those of groups IA, IB, IIA, IIB, IIIA, and IIIB (including rare earths), VIII (including noble metals) as well as by lead, tin and bismuth (periodic table in "Handbook of Physics and Chemistry," 76$^{th}$ Edition). The exchange is carried out by means of any water-soluble salts that contain the suitable cation.

The zeolite that is obtained by the process of the invention, i.e., a ZMB-30-type zeolite that is selected from among the ZBM-30, ZSM-48, EU-2 and EU-11 zeolites, can be used after calcination and exchange as an acidic solid for catalysis in the fields of refining and petrochemistry. It can also be used as an adsorbent for pollution control or as a molecular sieve for the separation. Advantageously, it is used as nuclei for the synthesis of zeolites of any structural type. When it is used in the form of nuclei, it can come in its crude synthesis form as well as in its calcined form or in its exchanged form.

For example, when it is used as a catalyst, the zeolite that is prepared according to the process of the invention is calcined and exchanged and can be combined with an inorganic matrix, which may be inert or catalytically active and with a metal phase. The inorganic matrix may be present simply as a binder to keep together the small particles of the zeolite under the different known forms of the catalysts (extrudates, pellets, balls, powders), or else can be added as a diluent for imposing the degree of conversion into a process that would otherwise proceed at too quick a rate, leading to fouling of the catalyst due to excessive coke formation. Typical inorganic matrices are in particular substrate materials for the catalysts such as silica, the different forms of alumina, magnesia, zirconia, titanium oxides, boron oxides, aluminum phosphates, titanium phosphates, zirconium phosphates, kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds.

The zeolite that is prepared according to the process of the invention can also be combined with at least one other zeolite and can act as a primary active phase or an additive.

The inorganic matrix can be a mixture of different compounds, in particular an inert phase and an active phase.

The metallic phase is introduced into only the zeolite, only the inorganic matrix or the inorganic matrix-zeolite group by ion exchange or impregnation with cations or oxides selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the periodic table.

The catalytic compositions comprising the zeolite that is prepared according to the process of the invention are suitable in a general way for the implementation of the primary processes for transformation of hydrocarbon and reactions for synthesis of organic compounds such as ethers.

When the zeolite that is prepared according to the process of the invention is used as an acidic solid in a catalyst that is used for the implementation of the catalytic reactions, the catalyst generally contains:

- at least one zeolite that is selected from among the ZBM-30, ZSM-48, EU-2 and EU-11 zeolites, synthesized according to the process described above, whereby said zeolite is at least in part in acidic form, i.e., in hydrogen form H,
- at least one metal of group VIII, preferably selected from the group that consists of palladium and platinum and even more preferably platinum,
- at least one binder, preferably alumina,
- optionally at least one element that belongs to the group that is formed by the elements of groups IB, IIB, IIIA, IVA, VIB and VIIB, preferably selected from the group that is formed by tin and indium, and optionally sulfur.

Any shaping method known to one skilled in the art is suitable for this catalyst. It is possible to use, for example, pelletizing or extrusion or shaping into balls. The shaping of the catalyst that contains the zeolite that is prepared according to the process of the invention and that is at least in part in acidic form is generally such that the catalyst is preferably in the form of extrudates or balls for the purpose of its use.

The metals can be introduced either all in the same way or by different techniques, at any moment of the preparation, before or after shaping and in any order. In addition, intermediate treatments such as, for example, a calcination and/or a reduction, can be applied between the deposits of the different metals.

These catalytic compositions advantageously find their application in hydroconversion reactions whose object is to improve the pour point of the feedstock, so-called dewaxing reactions. These reactions make it possible to convert a feedstock that has a high pour point into a product that has a lower pour point. These reactions can therefore be applied, for example, to the reduction of the pour point of gas oils. They also make it possible to reduce the pour point of heavier feedstocks so as to obtain oil bases that have good properties when cold and a high viscosity index.

The invention is illustrated by the following examples that do not in any case show a limiting nature.

EXAMPLE 1

Synthesis of Bis-(2-trimethylammonium ethyl)ether Bromide 14 g ($6.04 \cdot 10^{-2}$ mol) of bis-(2-bromoethyl)ether is mixed with 25 milliliters of ethanol. About four equivalents of trimethylamine in solution at 35% by mass in ethanol or 41 g of this solution ($24.32 \cdot 10^{-2}$ mol) is added to this solution.

This reaction mixture is refluxed for 3 hours while being stirred with the assistance of an oil bath ($T_{bath}=90°$ C.).

After synthesis, the reaction mixture is cooled in an ice bath. A white solid appears and is recovered by filtration. It is washed with anhydrous ether. The final product is purified once by ethanol (solvent)—ether (non-solvent) binary recrystallization. 17.76 g ($5.07 \cdot 10^{-2}$ mol) of bis-(2-trimethylammonium ethyl)ether is obtained. This product is characterized by nuclear magnetic resonance of the proton in $D_2O$: δ (ppm)/TMS=3.18 (s, $CH_2N(CH_3)_3$), 3.62-3.64 (t, $\overline{OCH_2CH_2N}$), 3.98-3.99 (m, $OCH_2CH_2\overline{N}$). The measurement of the melting point provides $T_f$=298-300° C.

EXAMPLE 2

Synthesis of Sample A (According to the Invention)

To prepare the gel, a first mixture incorporating 0.583 g of BTMAEE-$Br_2$ (bis-(2-trimethylammonium ethyl)ether bromide of formula [$(CH_3)_3N^+$—$(CH_2$—$CH_2)$—O—$(CH_2$—$CH_2)$—$N^+(CH_3)_3$]$2Br^-$), synthesized in a laboratory according to the method of Morren et al., (J. Pharm. Belg., 7, 295-304 (1952)) and described in Example 1, 0.133 g of sodium hydroxide (Fluka) and 8.97 g of distilled and deionized water are produced for 30 minutes and at ambient temperature. Then, a second mixture that incorporates the first mixture and 0.6 g of Aerosil 130 silica (Degussa) is produced for 1 hour at ambient temperature.

The molar composition of the gel that is thus obtained is:

60$SiO_2$:10$Na_2O$:10BTMAEE-$Br_2$:3000$H_2O$

This gel is then transferred into a 20 ml Teflon-coated stainless steel autoclave. In this autoclave, the gel undergoes crystallization at a temperature of 170° C. for a period of 2 days. A "turnspit"-type stirring is maintained at 35 rpm, whereby the axis of rotation is perpendicular to the longitudinal axis of the autoclave.

After filtering, the product is washed with the distilled and deionized water before being dried for one night at 60° C. The dried solid product was analyzed by X diffraction. The analysis demonstrates that the solid is formed by a ZBM-30-type zeolite, only crystallized phase present.

EXAMPLE 3

Synthesis of Sample B (According to the Invention)

To prepare the gel, a first mixture is produced, and then a second mixture incorporating the first is produced under the same conditions as in Example 2. A third mixture that incorporates the second mixture as well as 0.012 g of nuclei (ground ZSM-48 zeolite crystals) is produced for 30 minutes and at ambient temperature. The ZSM-48 zeolite that is used as crystals is raw straight from synthesis and purely silicic and was prepared in the presence of diquat-6 [$(CH_3)_3N^+$—$(CH_2)_6$—$N^+(CH_3)_3$].

The molar composition of the gel thus obtained is:

60$SiO_2$:10$Na_2O$:10BTMAEE-$Br_2$:3000$H_2O$, and the ZSM-48 zeolite nuclei that represent 2% by mass relative to the engaged silica mass.

This gel is then transferred into a 20 ml Teflon-coated stainless steel autoclave. In this autoclave, the gel undergoes crystallization at a temperature of 170° C. for one day. A "turnspit"-type stirring is maintained at 35 rpm, whereby the axis of rotation is perpendicular to the longitudinal axis of the autoclave.

After filtration, the product is washed with distilled and deionized water before being dried for one night at 60° C. The dried solid product was analyzed by X diffraction. The analysis demonstrates that the solid is formed by a ZBM-30-type zeolite, only crystallized phase present.

EXAMPLE 4

Synthesis of Sample C (According to the Invention)

To prepare the gel, the three stages of mixing under the same conditions as in Example 3 are carried out, except that the 0.133 g of sodium hydroxide is replaced by 0.187 g of potassium hydroxide during the first mixing stage.

The molar composition of the gel that is obtained by mixing is:

60$SiO_2$:10$K_2O$:10BTMAEE-$Br_2$:3000$H_2O$, and the ZSM-48 zeolite nuclei that represent 2% by mass relative to the silica mass that is input.

The nuclei are ZSM-48 crystals, raw straight from synthesis and purely silicic, prepared in the presence of diquat-6, [$(CH_3)_3N^+$—$(CH_2)_6$—$N^+(CH_3)_3$].

The stages of crystallization, filtration, washing and drying are identical to those of Example 3.

In the same way as in Examples 2 and 3, the DRX analysis demonstrates that the dried solid product is formed by a ZBM-30-type zeolite, only crystallized phase present.

EXAMPLE 5

Synthesis of Sample D (According to the Invention)

For this example, the amount of sodium hydroxide is reduced relative to Example 3.

To prepare the gel, the three stages of mixing are carried out under the same conditions as in Example 3, except that during the first mixing stage, 0.583 g of BTMAEE-Br$_2$ (bis-(2-trimethylammonium ethyl)ether bromide), synthesized in a laboratory according to the method of Morren et al., (J. Pharm. Belg., 7, 295-304 (1952)) and described in Example 1, 0.066 g of sodium hydroxide (Fluka), and 8.985 g of distilled and deionized water are incorporated.

The molar composition of the gel that is obtained by mixing is:

60SiO$_2$:5Na$_2$O:10BTMAEE-Br$_2$:3000H$_2$O, and the ZSM-48 zeolite nuclei that represent 2% by mass relative to the silica mass that is input.

The nuclei are crystals, raw straight from synthesis and purely silicic, prepared in the presence of diquat-6, [(CH$_3$)$_3$N$^+$—(CH$_2$)$_6$—N$^+$(CH$_3$)$_3$]. 

This gel is then transferred into a 20 ml Teflon-coated stainless steel autoclave. In this autoclave, the gel undergoes crystallization at a temperature of 170° C. for two days. A "turnspit"-type stirring is maintained at 35 rpm, whereby the axis of rotation is perpendicular to the longitudinal axis of the autoclave.

After filtration, the product is washed with distilled and deionized water before being dried for one night at 60° C. The dried solid product was analyzed by X diffraction. The analysis demonstrates that the solid is formed by a ZBM-30-type zeolite, only crystallized phase present.

EXAMPLE 6

Synthesis of Sample E (According to the Invention)

For this example, aluminum hydroxide is added into the gel.

To prepare the gel, the three mixing stages thus are carried out under the same conditions as in Example 3, except that during the first mixing stage, 0.583 g of BTMAEE-Br$_2$ (bis-(2-trimethylammonium ethyl)ether) bromide, synthesized in a laboratory according to the method of Morren et al. (J. Pharm. Belg., 7, 295-304 (1952)) and described in Example 1, 0.133 g of sodium hydroxide (Fluka), 0.0081 g of aluminum hydroxide (Reheis Ireland 79.7% of Al(OH)$_3$) and 8.9688 g of distilled and deionized water are incorporated.

The molar composition of the gel that is thus obtained is:

60SiO$_2$:0.25Al$_2$O$_3$:10Na$_2$O:10BTMAEE-Br$_2$:
3000H$_2$O, and the ZSM-48 zeolite nuclei representing 2% by mass relative to the silica mass that is input.

The nuclei are ZSM-48 crystals, raw straight from synthesis, and they have an Si/Al ratio that is equal to 120, prepared in the presence of diquat-6 [(CH$_3$)$_3$N$^+$—(CH$_2$)$_6$—N$^+$(CH$_3$)$_3$]. 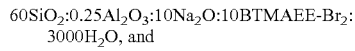

This gel is then transferred into a 20 ml Teflon-coated stainless steel autoclave. In this autoclave, the gel undergoes crystallization at a temperature of 170° C. for two days. A "turnspit"-type stirring is maintained at 35 rpm, whereby the axis of rotation is perpendicular to the longitudinal axis of the autoclave.

After filtration, the product is washed with distilled and deionized water before being dried for one night at 60° C. The dried solid product was analyzed by X diffraction. The analysis demonstrates that the dried solid is formed by a ZBM-30-type zeolite, only crystallized phase present.

The Si/Al ratio is equal to 120.

EXAMPLE 7

Preparation of a Catalyst Based on a ZBM-30 Zeolite Prepared According to the Process of the Invention The zeolite that is used in this example is the ZBM-30-type zeolite, raw straight from synthesis, obtained in the Si—Al system of Example 6 described above and having an overall Si/Al atomic ratio that is equal to 120.

This ZBM-30-type zeolite first undergoes an ion exchange stage that is operated by suspending zeolite in an ammonium nitrate solution with a 10 M concentration, at about 100° C., for 4 hours. The crystals are recovered by filtration, washed with permuted water, then dried in an oven at 100° C. for 16 hours, and are subjected two other times to ionic exchanges, filtrations, and washing and drying cycles.

This zeolite then undergoes a so-called dry calcination at 550° C. under a stream of air for 8 hours. The solid that is obtained is then put into the form of extrudates by mixing with boehmite (Pural SB3, Sasol) in a Z-arm mixing machine and extrusion of the paste that is obtained with a piston extruder. The extrudates are then dried at 120° C. for 12 hours in air and calcined at 550° C. for 2 hours under a stream of air in a muffle furnace.

Platinum is deposited on the alumina of this substrate by anion exchange with hexachloroplatinic acid in the presence of a competing agent (hydrochloric acid). The exchanged substrate is then dried at 120° C. for 12 hours in air and calcined at 550° C. under a stream of air for 1 hour.

The thus prepared catalyst is composed of contents by weight of 50% ZBM-30-type zeolite, hydrogen form, 49.8% of binder (alumina), and 0.2% of platinum.

With respect to the intermediate gels prepared by this invention, they have the same molar compositions as the starting reaction mixtures.

The preceding examples can be repeated with similar success by substituting the generically or specifically described reactants and/or operating conditions of this invention for those used in the preceding examples.

The entire disclosures of all applications, patents and publications, cited herein and of corresponding French application No. 05/11.278, filed Nov. 4, 2005 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the preparation of a zeolite selected from among the ZBM-30, ZSM-48, EU-2 and EU-11 zeolites and that comprises at least one element X selected from among silicon, germanium, and mixtures thereof wherein said process comprises mixing in an aqueous medium at least one source of said at least one element X and at least one nitrogen-containing organic compound Q, characterized in that said nitrogen-containing organic compound Q is selected from among the compounds that comprise at least one ether group and two terminal ammonium groups.

2. A process according to claim 1, wherein the element X is silicon.

3. A process according to claim 1, wherein the nitrogen-containing organic compound Q comprises at least one of a bis-(ω-trimethylammonium alkyl)ether salt and a bis(ω-triethylammonium alkyl)ether salt.

4. A process according to claim 3, wherein the bis-(ω-trimethylammonium alkyl)ether salt and bis(ω-triethylammonium alkyl)ether salt are halides.

5. A process according to claim 4, wherein the bis-(ω-trimethylammonium alkyl)ether salt and the bis(ω-triethylammonium alkyl)ether salt are bromides.

6. A process according to claim 5, wherein the element X is silicon.

7. A process according to claim 5, wherein said mixing is carried out in the presence of S nuclei of at least one zeolitic material that comprises a zeolite selected from among the ZBM-30, ZSM-48, EU-2 and EU-11 zeolites.

8. A process according to claim 4, wherein the element X is silicon.

9. A process according to claim 3, wherein the element X is silicon.

10. A process according to claim 1, wherein said aqueous medium comprising at least one source of at least one element X and at least one nitrogen-containing organic compound Q further comprises at least one element T selected from among aluminum, iron, gallium, boron, titanium, vanadium, zirconium, molybdenum, arsenic, antimony, chromium and manganese.

11. A process according to claim 10, wherein the element T is aluminum.

12. A process according to claim 10, wherein said mixing is carried out in the presence of S nuclei of at least one zeolitic material that comprises a zeolite selected from among the ZBM-30, ZSM-48, EU-2 and EU-11 zeolites.

13. A process according to claim 12, wherein both the zeolite that is to be prepared and said zeolitic nuclei comprise the same elements X and T.

14. A process according to claim 12, wherein the nuclei are introduced after homogenization, at least in part, of the aqueous mixture that contains the sources of elements X and T and said nitrogen-containing organic compound.

15. A process according to claim 1, wherein said mixing is carried out in the presence of S nuclei of at least one zeolitic material that comprises a zeolite selected from among the ZBM-30, ZSM-48, EU-2 and EU-11 zeolites.

16. A reaction mixture, expressed in oxide form comprising:

| | |
|---|---|
| $XO_2/T_2O_3$ (mol/mol) | 50-∞ |
| $OH^-/XO_2$ (mol/mol) | 0.002 to 2.0 |
| $Q/XO_2$ (mol/mol) | 0.002 to 5.0 |
| $H_2O/XO_2$ (mol/mol) | 1 to 500 |
| $S/XO_2$ (g/g) | 0.0 to 0.1 | where

X is silicon and/or germanium,

T is at least one element that is selected from among aluminum, iron, gallium, boron, titanium, vanadium, zirconium, molybdenum, arsenic, antimony, chromium and manganese, Q represents a nitrogen-containing organic structuring agent comprising at least one ether group and two terminal ammonium groups, S represents the nuclei of the zeolitic material comprising at least one zeolite in crude, dried, calcined or exchanged form.

17. A gel, expressed in oxide form comprising:

| | |
|---|---|
| $XO_2/T_2O_3$ (mol/mol) | 50-∞ |
| $OH^-/XO_2$ (mol/mol) | 0.002 to 2.0 |
| $Q/XO_2$ (mol/mol) | 0.002 to 5.0 |
| $H_2O/XO_2$ (mol/mol) | 1 to 500 |
| $S/XO_2$ (g/g) | 0.0 to 0.1 | where

X is silicon and/or germanium,

T is at least one element that is selected from among aluminum, iron, gallium, boron, titanium, vanadium, zirconium, molybdenum, arsenic, antimony, chromium and manganese, Q represents a nitrogen-containing organic structuring agent comprising at least one ether group and two terminal ammonium groups, S represents the nuclei of the zeolitic material comprising at least one zeolite in crude, dried, calcined or exchanged form.

18. An intermediate gel according to claim 17 comprising any of:

$60SiO_2:10Na_2O:10BTMAEE-Br_2:3000H_2O$ $60SiO_2:10K_2O:10\ BTMAEE-Br_2:3000\ H_2O$ $60SiO_2:5Na_2O:10BTMAEE-Br_2:3000H_2O$, or $60SiO_2:0.25Al_2O_3:10Na_2O:10\ BTMAEE-Br_2: 3000H_2O$ wherein $BTMAEE-Br_2$ represents (bis-(2-trimethylammonium ethyl)ether) bromide.

\* \* \* \* \*

UNITED STATES PATENT AND TRADEMARK OFFICE
CERTIFICATE OF CORRECTION

PATENT NO. : 7,622,099 B2  Page 1 of 1
APPLICATION NO. : 11/592326
DATED : November 24, 2009
INVENTOR(S) : Caullet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Twenty-sixth Day of October, 2010

David J. Kappos
*Director of the United States Patent and Trademark Office*